United States Patent [19]

Evans et al.

[11] Patent Number: 5,243,893
[45] Date of Patent: Sep. 14, 1993

[54] MECHANISM FOR POSITIONING A MATERIAL WORKING MACHINE

[75] Inventors: James P. Evans, Des Moines; Eldon E. Schultz, Truro; Charles D. Smith, Des Moines, all of Iowa

[73] Assignee: Pitt-Des Moines, Inc., Des Moines, Iowa

[21] Appl. No.: 871,472

[22] Filed: Apr. 21, 1992

[51] Int. Cl.⁵ .................................. B26D 5/02
[52] U.S. Cl. .............................. 83/859; 83/928; 72/455; 248/647
[58] Field of Search ............ 72/455, 446; 83/560, 83/523, 859, 928, 794, 801; 100/100; 248/647, 679

[56] References Cited

U.S. PATENT DOCUMENTS

| | | | |
|---|---|---|---|
| 1,408,156 | 2/1922 | Andren | 248/647 |
| 3,877,285 | 4/1975 | Trolle | 72/455 X |
| 3,892,154 | 7/1975 | Duffy | 83/560 X |
| 4,104,962 | 8/1978 | Castillo | 100/100 |
| 4,271,737 | 6/1981 | Steenson et al. | 83/928 X |
| 4,287,967 | 9/1981 | Perkins | |
| 4,364,695 | 12/1982 | Lenz | 248/647 X |
| 4,727,743 | 3/1988 | Baur | 72/446 |
| 4,768,621 | 9/1988 | Kunii | |
| 5,035,166 | 7/1991 | Carlson et al. | 83/801 |
| 5,063,804 | 11/1991 | Magnuson | 83/560 X |

Primary Examiner—Frank T. Yost
Assistant Examiner—Rinaldi Rada
Attorney, Agent, or Firm—Henderson & Sturm

[57] ABSTRACT

A mechanism for positioning a cutting and punching machine relative to a fixed conveyor for feeding material to be processed in a fixed horizontal route into the machine. The positioning mechanism comprises a carriage which supports the machine for back and forth movement laterally of the horizontal feeding route, which carriage is supported in turn on a support providing tracks for lateral movement of the carriage, with the support mounted within a lined pit. A drive unit is mounted on the machine for effecting lateral movement of the carriage, and a second drive unit is mounted within the lined pit below the support for moving the support vertically within the pit.

10 Claims, 5 Drawing Sheets

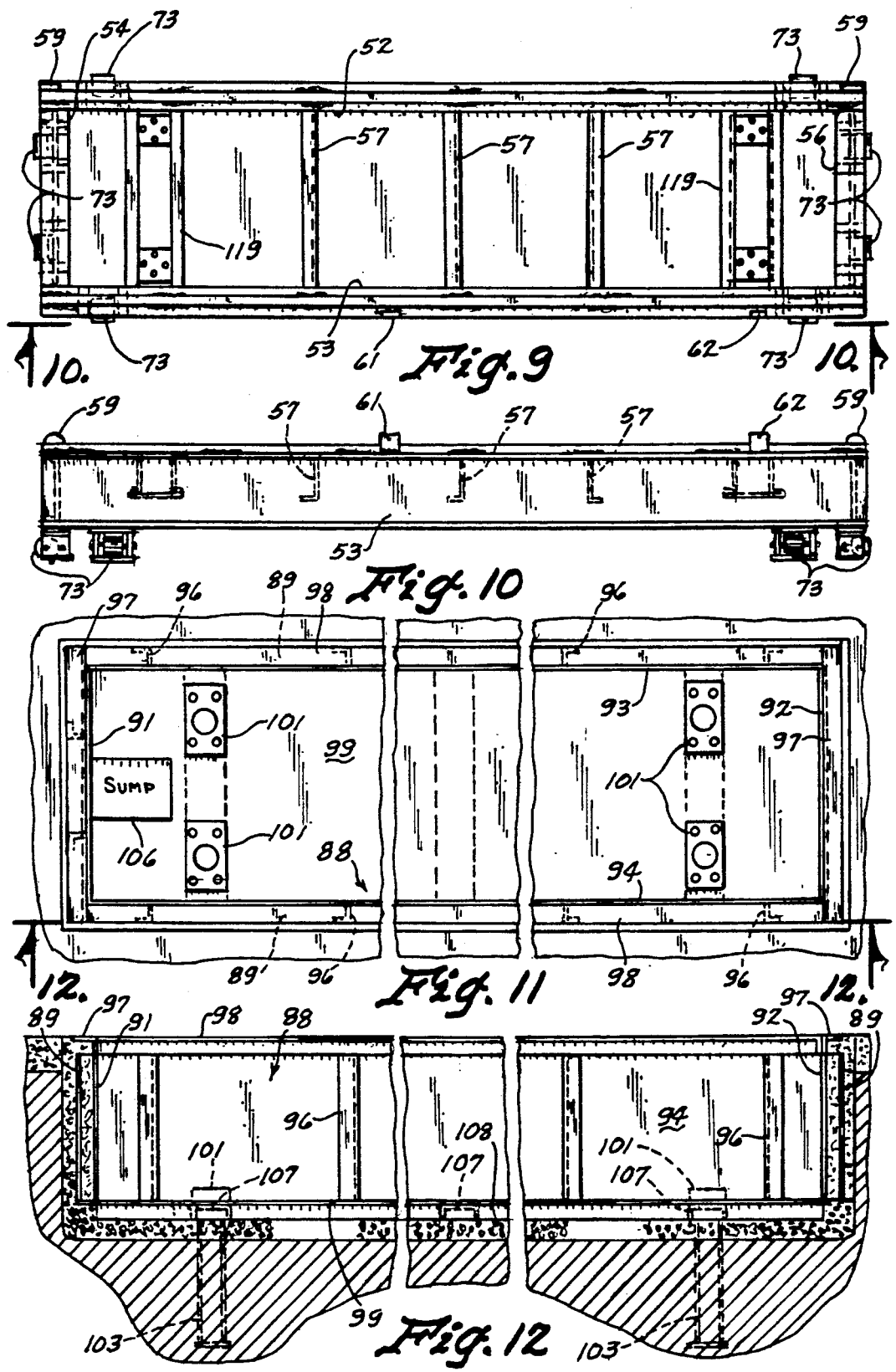

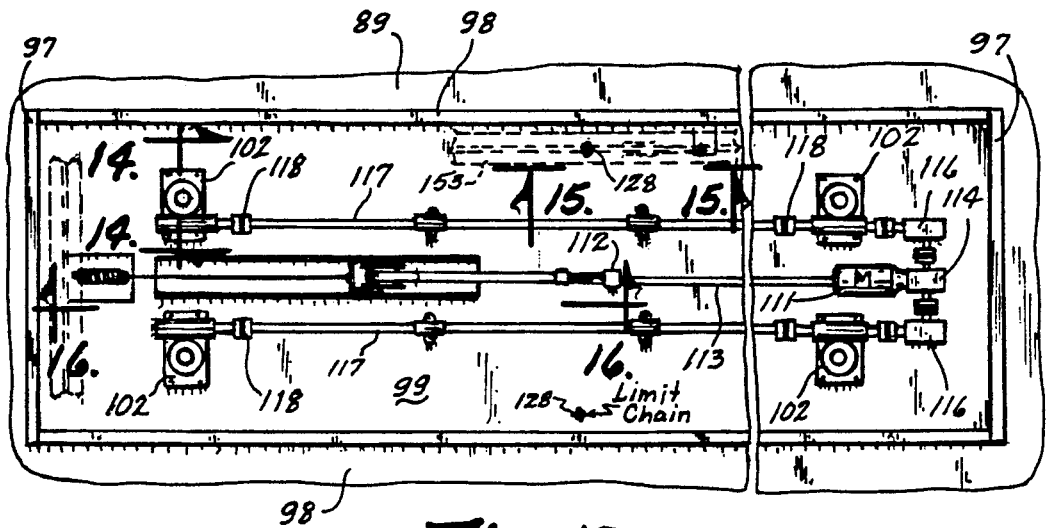
Fig. 13
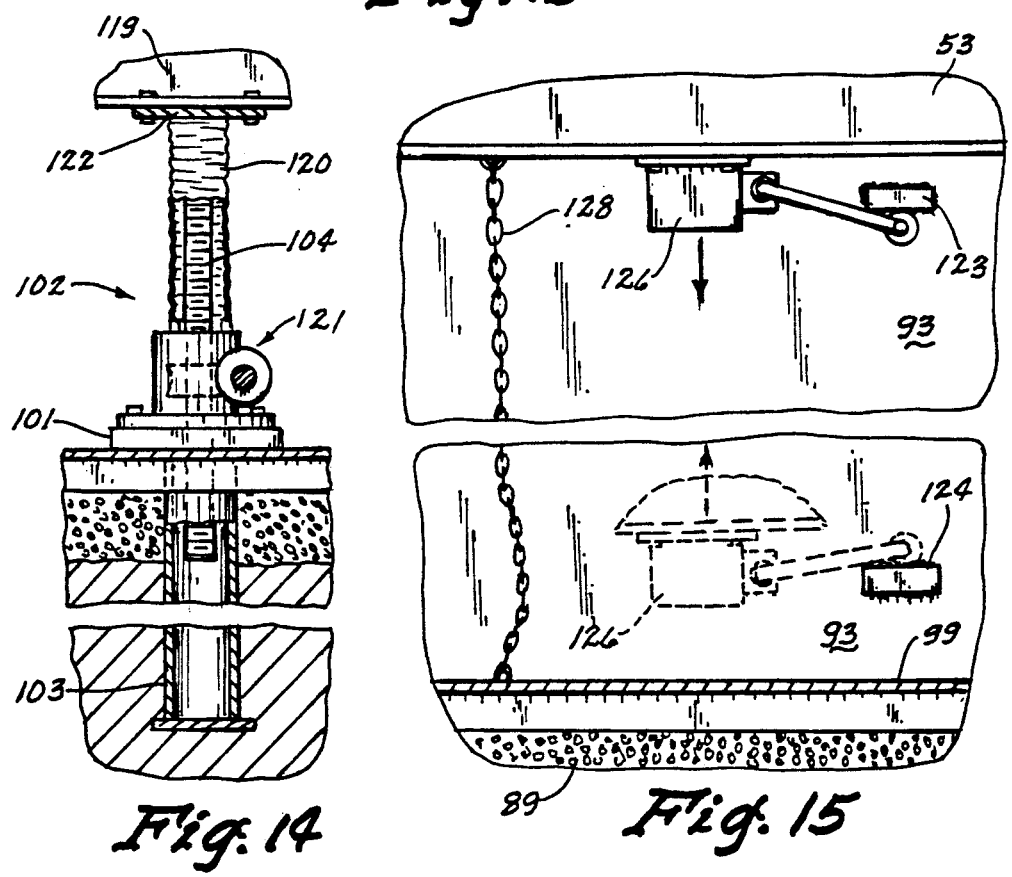
Fig. 14
Fig. 15

MECHANISM FOR POSITIONING A MATERIAL WORKING MACHINE

TECHNICAL FIELD

This invention relates to a mechanism for horizontally and vertically positioning a machine for receiving material, normally metal and of an elongated nature, for working as by cutting or punching the material, relative to a normally fixed conveyor for feeding the material to the machine.

BACKGROUND ART

The prior art comprises the fixed placement of a material working machine relative to one or more adjustable carriers for delivering material to the machine to be worked. An example of such a machine would be what is commonly called an ironworker. The ironworker has a plurality of work stations within its confines, which are adapted to cut or punch metal or like material of various sizes and shapes, which material may be of varying length as it is fed to the machine, up to 100 feet for example.

With the machine fixed to a floor surface, normally concrete, and with the work stations at various horizontally and vertically spaced positions in the machine, one can well visualize the difficulty of positioning, manually or otherwise, the material to be worked to be routed to the machine, with that difficulty exacerbated by the elongated nature of the material. Various types of feed carriers, scissors-nature and the like have been tried with varying degrees of success, but none completely satisfactory.

DISCLOSURE OF THE INVENTION

In view of the above, the present invention has the objective of obviating the above-described problems of the prior art and has for its main object the provision of a mechanism for horizontally and vertically positioning the material working machine for receiving material, normally metal and of an elongated nature, for working as by cutting or punching the material, relative to a normally fixed conveyor for feeding the material to the machine.

In order to achieve the above object, according to the present invention, there is provided a positioning mechanism for the machine which comprises a carriage assembly secured to the base of the machine for moving the machine in a horizontal plane in a direction normal to the feeding route to and through the machine of the detail material;

a support frame assembly mounted below and movably supporting said carriage assembly whereby said carriage assembly is movable laterally to the detail material feeding route and from one side thereof to the other side thereof;

first means mounted on the machine and operatively connected to said carriage assembly for moving said carriage assembly to locate the machine at a predetermined position relative to the detail material feeding route;

a pit liner assembly including a rectangular housing open at the top thereof and having vertical walls, said housing of a size for receiving said support frame assembly therein such that said support frame assembly is positionable substantially flush with the top of said pit liner assembly;

second means mounted within said pit liner assembly and connected to for moving said support frame assembly vertically relative to said pit liner assembly; and means connected to a power source for selectively controlling the operation of said first mean and said second means.

BRIEF DESCRIPTION OF THE DRAWINGS

These and other attributes of the invention will become more clear upon a thorough study of the following description of a preferred embodiment of the invention, particularly when reviewed in conjunction with the accompanying drawings, wherein:

FIG. 9 is a plan view of a support frame assembly as taken along the line 9—9 in FIG. 2;

FIG. 10 is a view taken along the line 10—10 in FIG. 9;

FIG. 11 is a foreshortened plan view of a pit liner housing for receiving and housing other components of the mechanism;

FIG. 12 is a foreshortened vertical sectional view as taken along the line 12—12 in FIG. 11;

FIG. 13 is a foreshortened plan view of vertical lift units as taken along the line 13—13 in FIG. 2;

FIG. 14 is an enlarged foreshortened vertical sectional view showing a screw jack unit as taken along the line 14—14 in FIG. 13;

FIG. 15 is a foreshortened vertical view as taken along the line 15—15 in FIG. 13;

BEST MODE FOR CARRYING OUT THE INVENTION

Figure 1:
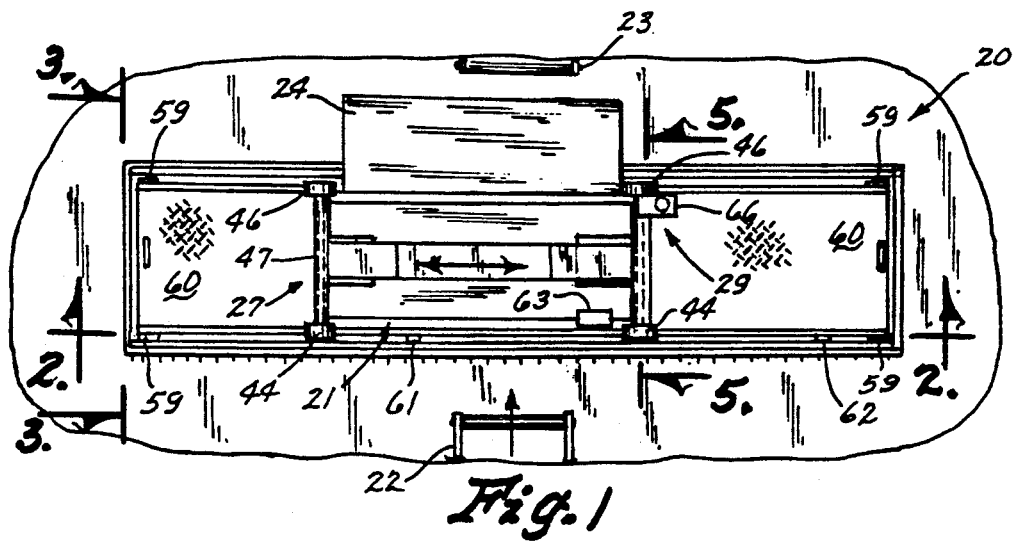
FIG. 1 is a plan view showing a mechanism for positioning a material working machine in accordance with one embodiment of the present invention.
Figure 2:
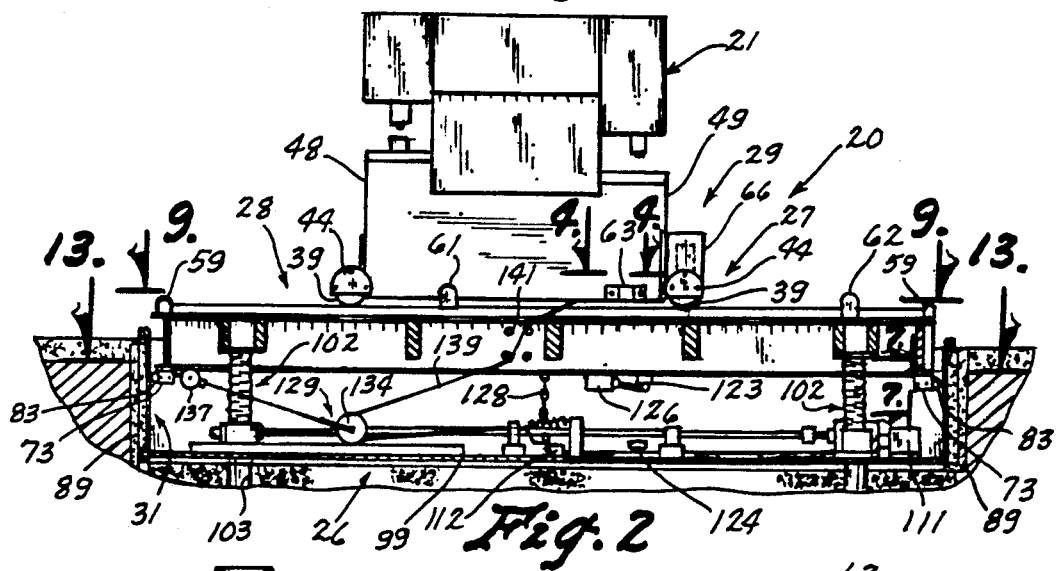
FIG. 2 is a vertical sectional view of the mechanism as taken along the line 2—2 in FIG. 1.
Figure 3:
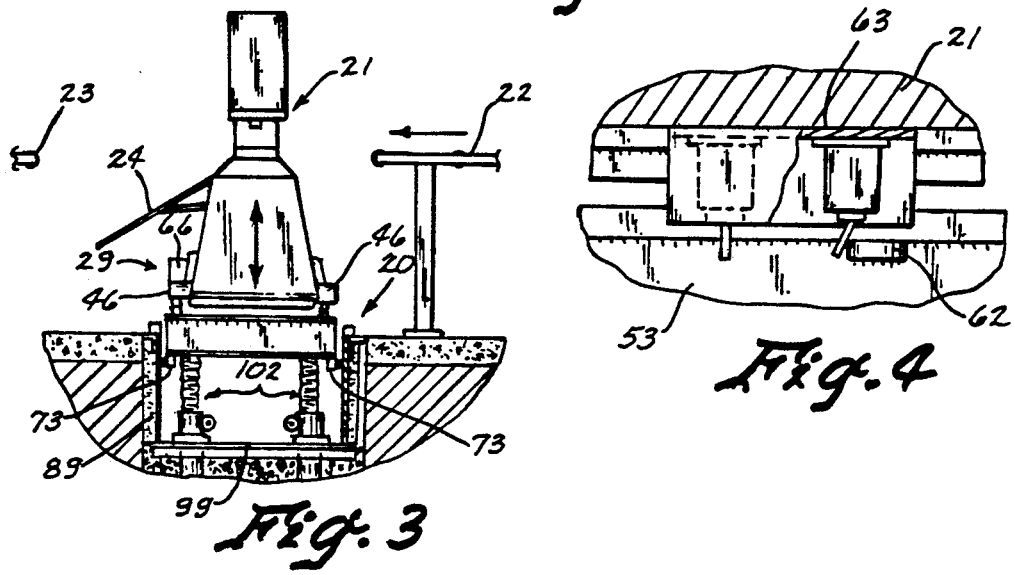
FIG. 3 is a vertical sectional view taken along the line 3—3 in FIG. 1.

Referring now to the drawings wherein like reference numerals designate identical or corresponding parts throughout the several views, a mechanism is indicated generally at (20) in FIGS. 1-3 for positioning a material working machine (21). The machine is conventional carrying the brand name GEKA Hydracrop 100/S, and is provided with a plurality of work stations through which bar and like stock detail (not shown) can be moved from off a conveyor (22), for cutting and/or punching before discharge to a receiving conveyor (23). A chute (24) has been added to the discharge side of the machine (21) to ensure cuttings or punchings do not fall into a pit (26) formed below the machine (21), however, the machine (21) is not a part of this invention.

The inventive mechanism (20) comprises generally a carriage assembly (27) adapted to be secured to the base of the machine (21) or any like machine, for moving the machine (21) in a horizontal plane perpendicular to the feed route of the detail as determined by the longitudinally aligned positioning of the conveyers (22), (23); a support frame assembly (28) (FIGS. 2 and 3) approximately twice the length of the carriage assembly (28) and movably supporting same whereby the carriage assembly (28) is movable longitudinally of the frame assembly (28) from one end to the other end, and thus moves the machine (21) laterally to the detail feed route and from one side thereof to the other; a first motive unit (29) (FIGS. 2 and 5) mounted on the machine (21) as by welding and operatively connected as seen hereafter in detail to the carriage assembly (27) for moving the carriage assembly (27) and the machine (21) to any one of several predetermined positions in front of the discharge conveyer (22); a pit liner assembly (31) (FIGS. 3, 11 and 12) of a size slightly greater than the frame assembly (28) for receiving same therein for vertical movement; a second motive unit (32) (FIGS. 2 and 13) mounted within the pit liner assembly (31) for moving the frame assembly (28) vertically relative to the pit liner assembly (31); and an electrical control system (33) (FIG. 17) for selectively controlling both the first and second motive units (29), (32) respectively, for either independent or simultaneous operation.

More particularly, the carriage assembly (27) includes a pair of wheel and axle units (34), (36) (FIGS. 5 and 6) and a pair of shield or fender units (37), (38) therefor. Each unit (34), (36) includes a pair of wheels (39), (41) one (41) of which is flanged, secured appropriately at opposite ends of an axle (42). On one of the units (36) (FIGS. 5 and 6) a sprocket (43) is secured adjacent the flanged wheel (41) for receiving drive from the first motive unit (29). Each fender unit (37), (38) includes a pair of semi-circular fenders (44), (46) adapted to surround the wheel upper portion in conventional manner and which fenders are interconnected by an L-shaped member (47), each member (47) adapted to be placed over the base of one end (48) of the machine (21) the base of the other end (49) as best seen in FIGS. 1 and 2. Stiffeners in the form of gusset plates (51) are provided as both the member (47), the fenders (46) and the gusset plates (51) are secured as by welding to the machine (21) to provide a rollable support for the machine (21). A pair of plates (50) are secured in laterally spaced relation to the underside of the member (47) and serve to support the axle (42) extended therethrough and rotatable within bearings (55).

Figure 4:
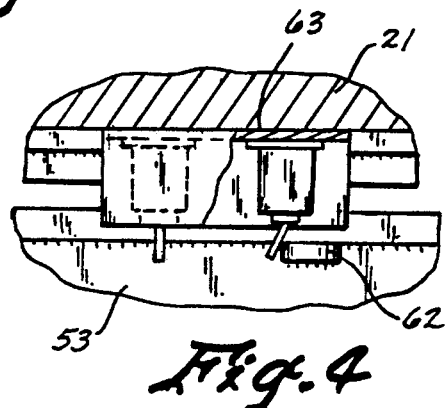
FIG. 4 is a detail view of a limit switch as taken along the line 4—4 in FIG. 2.

The support frame assembly (28) comprises side members (52), (53) (FIG. 9) and end members (54), (56) with cross brace members (57) forming a rugged, rectangular structure for supporting the carriage assembly (27), hereinafter "carriage," on which the machine (21) is mounted. A pair of elongated bars (58) (FIG. 5) are mounted longitudinally in parallel relation on the side members (52), (53) to support the wheels (39), (41), it being noted that the flanged wheel (41) limits lateral movement of the carriage (27) and prevents it leaving the bars (58), which function as tracks. Physical limits (59) (FIG. 10) are placed at each end of one of the tracks (58) to limit longitudinal movement of the carriage (27), and stop (61), (62) are placed in spaced relation on the opposite side of the frame assembly (28) for cooperation with a pair of electric limit switches (63) (FIGS. 2 and 4) mounted on an adjacent side of the machine (21) for providing automatic control of the longitudinal movement of the carriage (27).

Figure 7:
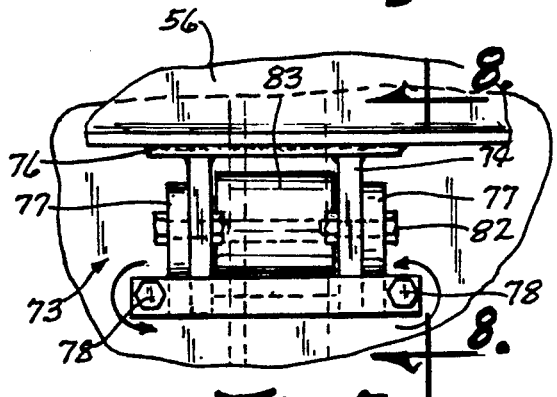
FIG. 7 is an enlarged detail view of a guide roller unit as taken along the line 7—7 in FIG. 2.
Figure 8:
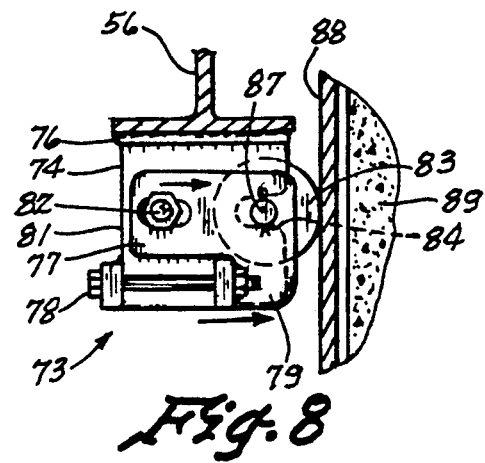
FIG. 8 is a view taken along the line 8—8 in FIG. 7.

To position the support frame assembly (28) within the pit liner assembly (31) (FIG. 2) for a smooth and even vertical movement, a plurality of guide roller units (73) (FIGS. 7 and 8) are provided, two on each end and on each side of the frame assembly (28). Each unit (73) includes an H-shaped bracket (74) with an upper plate (76) secured to the bottom of a side or end member (52), (53) or (54), (56), respectively, of the frame assembly (28), and with an L-shaped central member (77) movable horizontally and positioned within the bracket (74) by a fastener device (78) movable against a leg (79) of the member (77). An adjustment slot (81) is formed within the member (77) through which an adjusting bolt (82) extends and a pair of rollers (83) are movably mounted within an open-ended slot (84) formed in the face portion (86) of the member (77) and held for lateral movement therein by fasteners (87). By this arrangement, the rollers (83) can "give" with any variance in the vertical nature of a pit liner assembly wall (88).

The limit switch (63) is an element of the first motive unit (29) comprising further a drive motor (64) (FIG. 5) mounted within a housing (66) secured to the machine (21), and rotating a drive shaft (67) through a right angle drive speed reducer (68). A drive sprocket (not shown) mounted on the shaft (67) rotates a chain drive (69) in turn driving a driven sprocket (43) which drives a shaft (72) to the flanged drive wheel (41'). Thus, in combination with the limit switch (63) and stops (61), controlled movement of the machine (21) and carriage (27) longitudinally of the frame assembly (28) and laterally of the discharge conveyer (22) is provided.

The pit liner assembly (31) is best illustrated in FIGS. 2, 3, 11 and 12 and is placed within a concrete form (89), and includes end plates (91), (92) and side plates (93), (94) welded together to form the pit liner (88), with vertical angle irons (96) secured in spaced relation along the sides and ends of the pit liner (88) to function as stiffeners and with covering L-iron end and side pieces (97), (98) forming a rectangular upper or top surface structure for the pit assembly (31). The bottom wall (99) of the pit assembly (31) completes the liner (88). Face plates (101) are mounted on the bottom wall (99) for receiving screw jacks units (102) (FIG. 2), with casings (103) being sunk below the bottom wall (99) (FIG. 12) to receive the screw jacks (104) (FIG. 14) in their lowered positions. A sump (106) (FIG. 11) may be formed in the bottom wall (99) should a high water table necessitate same. Further, U-shaped beams (107) are placed across the bottom (108) of the concrete pit (109) to provide structural support for the pit liner (88).

Figure 5:
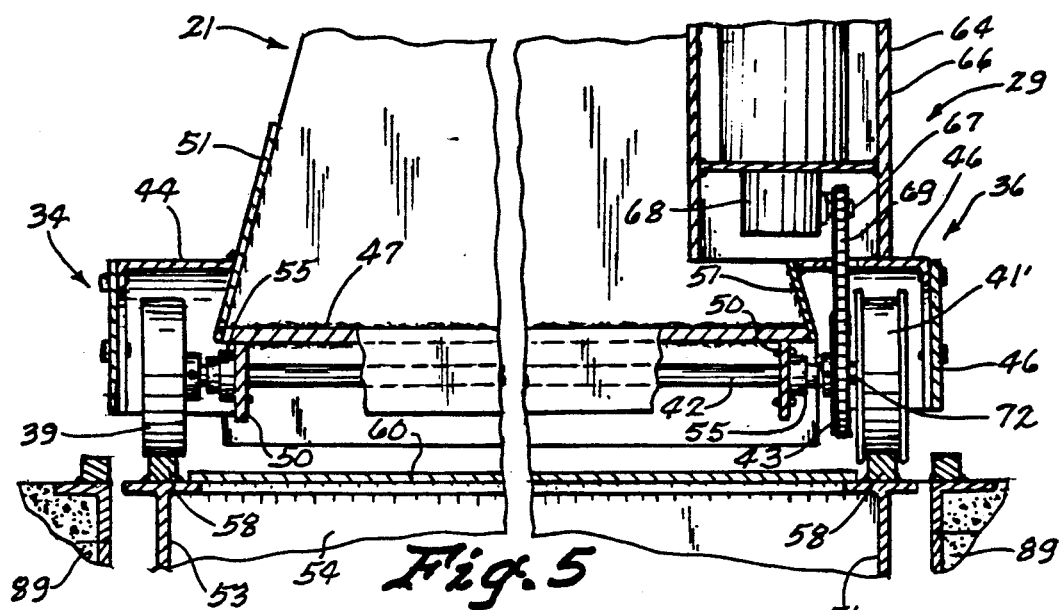
FIG. 5 is an enlarged, fragmentary vertical sectional view at the base of the machine as taken along the line 5—5 in FIG. 1.
Figure 6:
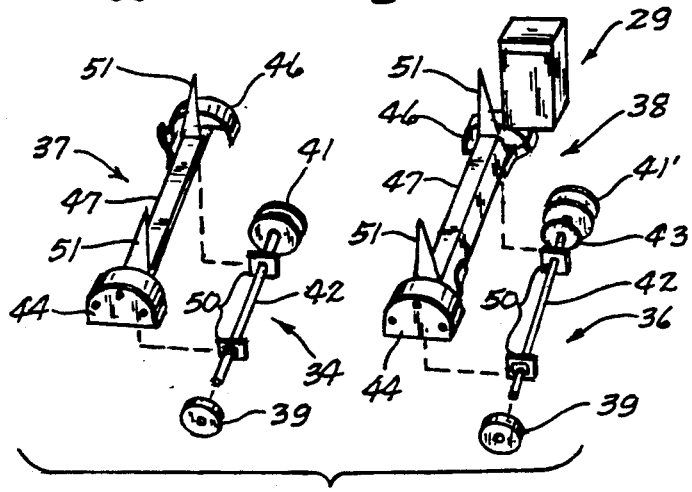
FIG. 6 is an exploded, detail view of wheel and axle units for the mechanism carriage assembly.

Flat cover plates (60) are removably supported on inner flanges of the tracks (58) FIGS. 1 and 5) to provide cover for the outer portions of the pit area within the pit liner assembly (31), and function further as a safety structure to prevent personnel and other items from falling into the pit liner (88) on either side of the machine (21) and carriage assembly (28).

The second motive unit (34) is best shown in FIGS. 2 and 13, and includes a drive motor (111) receiving power through a junction box (112) and conduit (113), electric power coming into the box (112) from an exterior power source. A worm gear speed reducer (114) transmits the power in two paths through a pair of bevel gear units (116) and drive shafts (117) with couplers (118) to a quartet of screw jack units (102) placed in a rectangular arrangement on the bottom wall (99) of the pit liner (88) for engagement with the undersurface of H-beams (119) (FIG. 9) placed across the ends of the support frame assembly (28). The screw jack units (102) are commercially available units each including a worm and gear assembly (121) (FIG. 14) for running up, and down a screw jack (104) within a cloth cover (120), and with a plate (122) at the top for engagement with the frame assembly H-beams (119).

To control the vertical movement of the frame assembly (28), a pair of vertically spaced stops (123), (124) (FIG. 2) are secured to a wall of the pit liner (88), and a limit switch (126) is secured to the base (127) of the frame assembly (28). More than one such limit switch (126) may be used. One or more chains (128) (FIGS. 2 and 15) are also secured between the frame assembly (28) and the pit liner bottom wall (99) as safety means to limit the upward movement of the frame assembly (28) relative to the pit liner (88).

Figure 16:
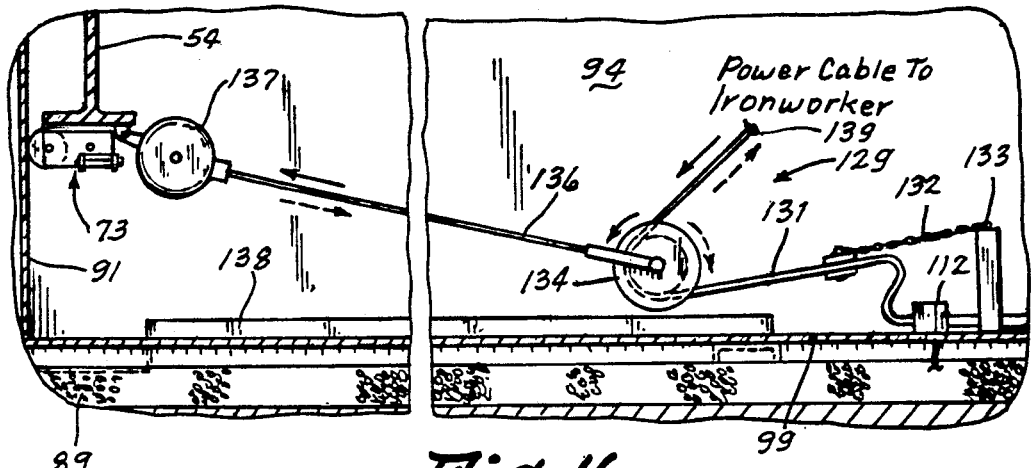
FIG. 16 is a foreshortened vertical view showing a cable take-up unit as taken along the line 16—16 in FIG. 13.

The second motive unit (34) further includes a cable take-up unit (129) (FIG. 16) including a festoon cable (131) extended from the junction box (112) and held taut by a chain (132) fastened to a mount (133) on the pit liner bottom wall (99), and by an opposing pulley (134) held tight by a cord (136) from a take-up device (137) secured to an end member (54) of the frame assembly (28). An elongated guide track (138) is placed centrally of the pit liner bottom wall (99) to form a guide for fore and aft movement of the pulley (134); and it will be noted in FIG. 2 that the upper end (139) of the cable (131) is trained within a quartet of rollers (141) arranged in a rectangle on the inside of a side member (52) before passing upwardly through an opening in the frame assembly (28) upper surface for connection to the drive motor (64) of the first motive unit (29).

Figure 17:
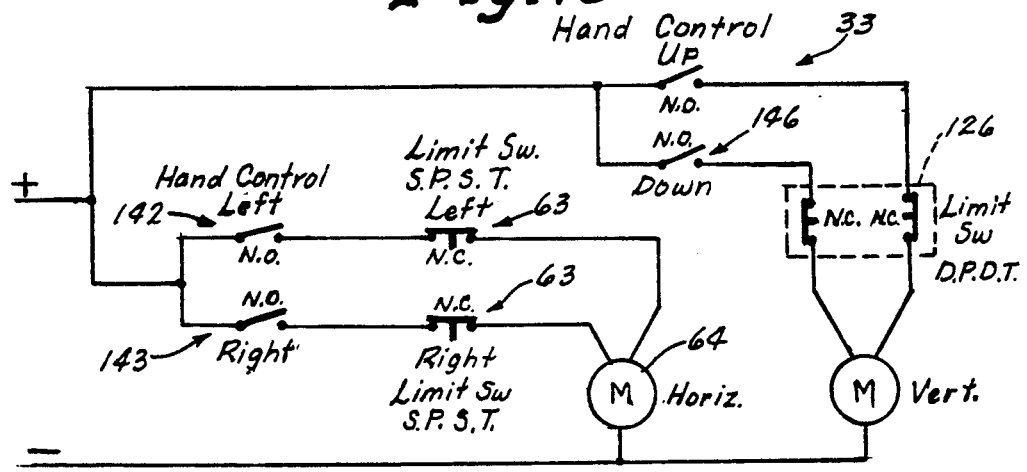
FIG. 17 is an electrical schematic for the working machine positioning mechanism.

Referring to FIG. 17, an electrical schematic for the control circuitry of the positioning mechanism (20) is illustrated, with all components previously identified except for a pair of normally open hand control switches (142), (143) for controlling the vertical movement of the support frame assembly (28) by operation of the reversible drive motor (111), and a pair of normally open hand control switches (144), (146) for controlling the horizontal movement of the carriage assembly (27) by operation of the reversible drive motor (64). It will be noted that simultaneous operation of both drive motors (64), (111) is provided for effecting controlled horizontal and vertical movement of the carriage assembly (27) to position the machine (21) at any predetermined location relative to the discharge conveyor (22).

We claim:

1. Mechanism for positioning a material working machine having a base and one or more detail material working stations as a part thereof, wherein the detail material to be worked is fed to the machine from one side thereof and in a horizontal disposition so as to pass from the one side through the machine to and out of the other side, the positioning mechanism comprising in combination:

a carriage assembly secured to the base of the machine for moving the machine in a horizontal plane in a direction lateral to the feeding route to and through the machine of the detail material;

a support frame assembly mounted below and movably supporting said carriage assembly whereby said carriage assembly is movable laterally from one side of said support frame assembly to the other side thereof;

first means mounted on the machine and operatively connected to said carriage assembly for moving said carriage assembly to locate the machine at a predetermined position relative to the detail material feeding route;

a pit liner assembly including a rectangular housing having a top which is open and having vertical walls, said housing of a size for receiving said support frame assembly therein such that said support frame assembly is positionable substantially horizontally even with the top of said pit liner assembly;

second means mounted within said pit liner assembly and connected to said support frame assembly for moving said support frame vertically relative to said pit liner assembly; and means connected to a power source for selectively controlling the operation of said first means and said second means.

2. The mechanism of claim 1 and further wherein said carriage assembly comprises a pair of wheel and axle assemblies mounted fore and aft of the machine, each assembly including an axle and a wheel mounted at each end of said axle.

3. The mechanism of claim 2 and further wherein said support frame assembly having a pair of tracks mounted thereon in a parallel manner for receiving said wheel and axle assemblies.

4. The mechanism of claim 3 and further wherein said support frame assembly including a plurality of roller assemblies secured thereto, said roller assemblies engageable at all times with said walls during vertical movement of said support frame assembly to said walls.

5. The mechanism of claim 2 and further wherein said first means including a drive unit operatively connected to one of said wheel and axle assemblies for applying power thereto to move said carriage assembly within the horizontal plane.

6. The mechanism of claim 1 and further wherein said pit liner assembly housing having side and end walls and a bottom wall of a size slightly larger in length and width than said support frame assembly.

7. The mechanism of claim 1 and further wherein said second means including a plurality of vertically disposed screw jack units extended between a bottom wall of said housing and said support frame assembly, and drive means mounted on said bottom wall for applying power to said screw jack units for raising and lowering said support frame assembly.

8. The mechanism of claim 1 and further wherein said control means including a flexible power cable connected to the power source and having one end within said housing and having another end connected to said first means, a pulley unit disposed within said housing, said cable trained about said pulley unit, and means mounted within said housing and connected to said pulley unit for maintaining said cable taut at all positions of said carriage assembly.

9. The mechanism of claim 1 and further wherein said carriage assembly comprising a wheel and axle assembly mounted for and aft, respectively, of the machine, said support frame assembly having a pair of tracks mounted thereon in a parallel manner for receiving said wheel and axle assemblies, said first means including a drive unit operatively connected to one of said wheel and axle assemblies for applying power thereto to move said carriage assembly within the horizontal plane, and said second means including a plurality of vertically disposed screw jack units extended between a bottom wall of said housing and said support frame assembly, and drive means mounted on said bottom wall for applying power to said screw jack units for raising and lowering said support frame assembly.

10. The mechanism of claim 9 and further wherein said control means including a flexible power cable connected to the power source and having one end within said housing and having another end connected to said first means, a pulley unit disposed within said housing, said cable trained about said pulley unit, and means mounted within said housing and connected to said pulley unit for maintaining said cable taut at all positions of said carriage assembly.

* * * * *